United States Patent Office 2,854,912
Patented Oct. 7, 1958

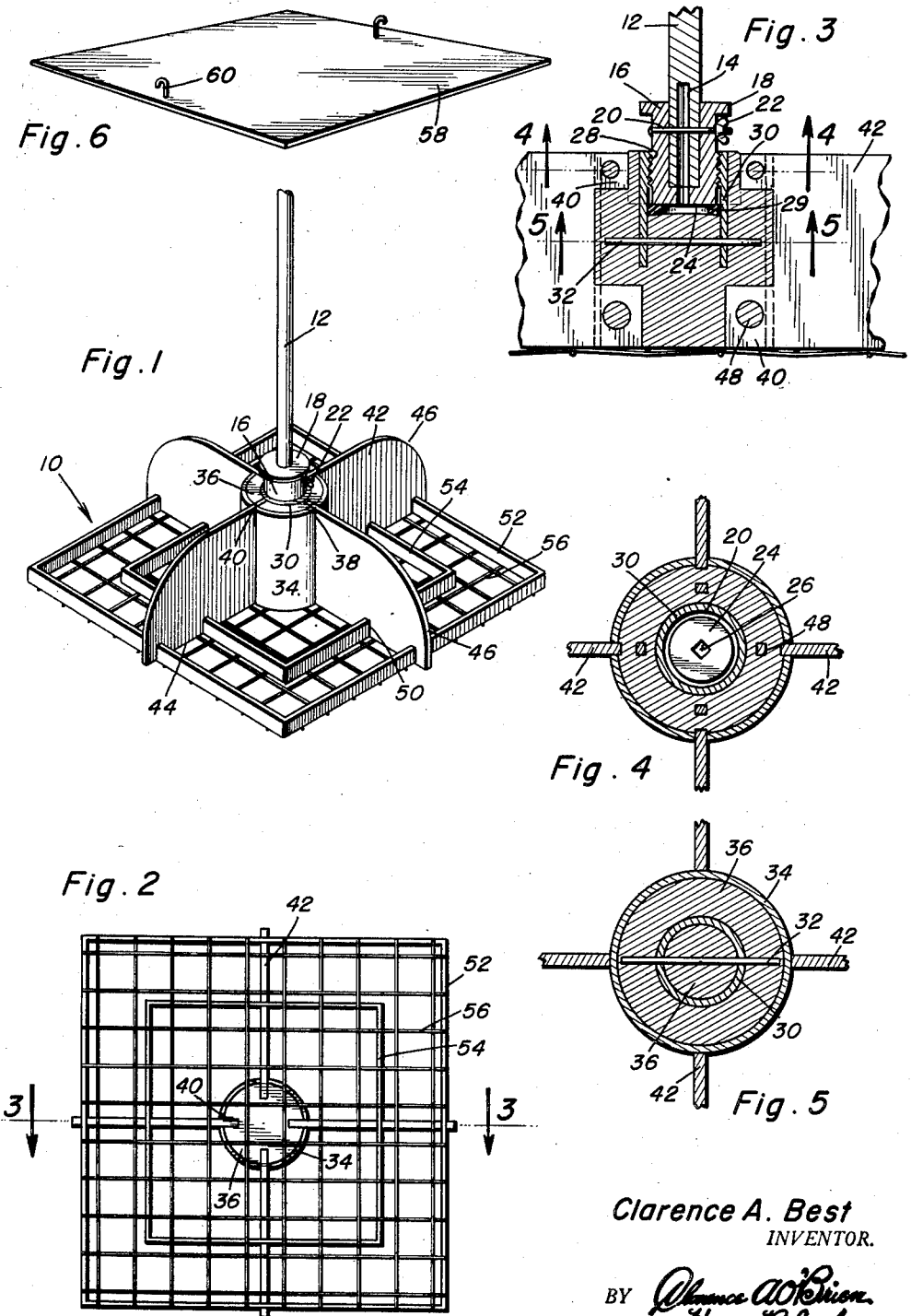
Clarence A. Best
INVENTOR.

2,854,912

GARDEN PULVERIZER

Clarence A. Best, New Albany, Ind.

Application March 28, 1956, Serial No. 574,540

3 Claims. (Cl. 97—61)

This invention generally relates to a soil working tool and more specifically provides a cultivator specifically adapted for use in a garden or other relatively small area wherein the soil may be thoroughly cultivated.

An object of the present invention is to provide a hand-type garden pulverizer which is operated by reciprocation of the tool when carried in the hands wherein the device includes a plurality of narrowly spaced cutting blades for thoroughly breaking up any clods and reducing the soil to a fine cultivated state.

Another object of the present invention is to provide a garden pulverizer incorporating a handle and a connection thereto wherein the handle may be employed for other garden implements and wherein a flat plate may be attached for packing soil when desired.

Other objects of the present invention will reside in its simplicity of construction, ease of operation, adaptation for its particular purposes and its relatively inexpensive manufacturing cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of the present invention with portions of the handle broken away;

Figure 2 is a bottom plan view of the pulverizer of the present invention;

Figure 3 is a transverse, vertical sectional view taken substantially upon a plane passing along section line 3—3 of Figure 2 illustrating the assembly details of the pulverizer;

Figure 4 is a transverse, vertical sectional view taken substantially upon a plane passing along section line 4—4 of Figure 3 illustrating the structural details thereof;

Figure 5 is a transverse sectional view taken substantially upon a plane passing along section 5—5 of Figure 3 illustrating further structural details of the pulverizer assembly; and Figure 6 is a perspective view of a plate attachment which may be attached to the pulverizer for converting the same to a tamper.

Referring now specifically to the drawing, the numeral 10 generally designates the garden pulverizer of the present invention which is attached to an elongated wooden handle 12 of cylindrical shape which includes an inwardly extending polygonal socket 14 at the lower end thereof to which may be attached other garden tools (not shown).

Mounted on the lower end of the handle 12 is a cylindrical adapter collar 16 having a flange 18 at its upper end and being secured to the handle 12 by a transverse bolt 20 having a wing nut 22 thereon which extends through the adapter collar 16 and the handle 12 thereby securing the adapter collar to the handle 12. The adapter collar 16 is provided with an inwardly extending closure flange 24 at the lower end thereof which is provided with a polygonal opening 26 which may be the same shape and size as the socket 14 for facilitating the attachment of the handle 12 and adapter 16 to other garden tools.

The outer surface of the lower end of the adapter collar 16 is provided with screw threads 28 for detachable engagement with a cylindrical sleeve 30 having internal screw threads at the upper end thereof.

Extending transversely of the sleeve 30 and projecting therefrom is a transverse pin 32 which terminates adjacent the inner surface of an outer cylindrical sleeve 34 concentric with the sleeve 30. Disposed between the concentric sleeves 30 and 34 is lead 36 or similiar material which may be positioned therein in a molten state which will subsequently harden and rigidly secured the sleeves 30 and 34 in assembled relation. The outer sleeve 34 is provided with upper and lower inwardly extending slots 38 for receiving inwardly extending lugs 40 on radial blades 42 which are provided with a straight horizontal lower edge 44 and a rounded upper edge 46. The lugs 40 extend through the notches or slots 38 and are provided with apertures 48 therein for receiving the lead 36 thereby rigidly securing the arms or blades 42 to the sleeve 34 thereby forming a completely assembled and rigid construction which permits the detachment of the handle 12 by removal of the bolt 20 or permits detachment of the handle 12 and the adapter collar 16 by unscrewing the same whereby the separated elements may be employed within other garden tools when desired. Inasmuch as the lead 36 or material similar thereto is poured between the concentric sleeves 30 and 34 where in a molten state, the lead will completely fill the area therebetween and will also engage in the apertures 48 in the lugs 40 thereby rigidly securing the radial blades 42 to the central sleeves 30 and 34. It is pointed out that the apertures 48 in the lower lugs 40 are larger than the apertures 48 in the upper lugs 40 on the blades 42 since a greater force is exerted on the lower edges 44 of the blades 42 thereby requiring a larger holding force.

The lower horizontal edges 44 of each of the blades 42 are provided with at least two inwardly extending notches 50 which are in equally spaced relation on each of the blades 42 for receiving a pair of concentric and continuous square members 52 and 54 wherein the members 52 and 54 act as a supporting framework for a wire grid 56 which includes a plurality of intersecting wire members forming relatively small openings wherein the wire grid 56 is secured to the members 52 and 54 so that reciprocation of the cultivator 10 will engage and break all clods into very small particles so that the soil will be properly cultivated.

As illustrated in Figure 6, a generally square flat plate 58 is provided which may be mounted against the under-surface of the wire grid 56 by employing a pair of diametrically opposed J-bolts 60 which engage over the outer square frame member 52 whereby the plate 58 will act as a tamper when the handle 12 is reciprocated by hand.

With the present invention, it will be understood that the wire grid 56 may be omitted if desired and the mesh or space between the wire members forming the wire grid may be altered to any desired standard which is dependent upon the condition of the soil when using the pulverizer and the condition of the soil that is required. If a tamper is desired, the plate 58 may be secured in position wherein the device will act as a tamper when reciprocated in the usual manner. Also, the handle 12 may be employed for attachment to other garden implements such as rakes, hoes or the like. The vertical positioning of the plates forms a rigid reinforcement for the wire grid 56 and the concentric frame members 52 and 54 thereby assuring a rigid and long-lasting construction. The screw threads 28 may be conventional tapered pipe threads and a resilient gasket 29 may be provided for positioning under the collar 16 for absorbing some of the shock of the impact and also retaining the collar 16 in screw threaded engagement with the sleeve 30. The gasket 29 may be in the form of an annular member or a circular disc of resilient material.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A soil pulverizer comprising a cylindrical sleeve, a plurality of radial blades connected to said sleeve, a plurality of concentric ring members mounted on the bottom edges of said blades for cultivating the soil, a handle connected with said sleeve for reciprocating said concentric ring members, said sleeve having openings therein and said blades having lugs extending through said openings into the interior of the sleeve, and metal filling the interior of the sleeve and rigidly securing the lugs in the openings, said metal forming a weight for said pulverizer.

2. A soil pulverizer comprising inner and outer cylindrical sleeves, a plurality of radial blades connected to said outer sleeve, a plurality of concentric ring members mounted on the bottom edges of said blades for cultivating the soil, a handle connected with said inner sleeve for reciprocating said concentric ring members, said outer sleeve having openings therein and said blades having lugs extending through said openings into the interior of said outer sleeve, and metal filling the interior of the sleeve and the space between said inner and outer sleeves, and rigidly securing the lugs in the openings, said metal forming a weight for said pulverizer, said inner sleeve being open at the bottom and having a transverse pin extending therethrough and projecting diametrically therefrom, said pin being embedded in said metal thereby locking said inner and outer sleeves in rigid concentric relation.

3. A soil pulverizer comprising inner and outer cylindrical sleeves, a plurality of radial blades connected to said outer sleeve, a plurality of concentric ring members mounted on the bottom edges of said blades for cultivating the soil, a handle connected with said inner sleeve for reciprocating said concentric ring members, said outer sleeve having openings therein and said blades having lugs extending through said openings into the interior of said outer sleeve, and metal filling the interior of the sleeve and the space between said inner and outer sleeves, and rigidly securing the lugs in the openings, said metal forming a weight for said pulverizer, said inner sleeve being open at the bottom and having a transverse pin extending therethrough and projecting diametrically therefrom, said pin being embedded in said metal thereby locking said inner and outer sleeves in rigid concentric relation, said concentric ring members being square and in the form of metal straps disposed on edge, and a wire grid mounted on said straps for breaking the soil into small particles.

References Cited in the file of this patent
UNITED STATES PATENTS

| | | |
|---|---|---|
| 50,724 | McNiel | Oct. 31, 1865 |
| 1,569,421 | Coelho | Jan. 12, 1926 |
| 1,856,954 | Hayward | May 3, 1932 |
| 2,291,160 | Johnson | July 28, 1942 |